United States Patent [19]

Lindsey

[11] Patent Number: 6,002,581
[45] Date of Patent: Dec. 14, 1999

[54] LAP TOP COMPUTER SYSTEM WITH ELEVATING PORT COVER

[75] Inventor: Todd D. Lindsey, Sioux City, Iowa

[73] Assignee: Gateway 2000, Inc., North Sioux City, S. Dak.

[21] Appl. No.: 08/916,756

[22] Filed: Aug. 19, 1997

[51] Int. Cl.$^6$ ................................................ G06F 1/16
[52] U.S. Cl. ............................ 361/680; 312/223.2
[58] Field of Search .............................. 361/683, 726, 361/727, 680; 364/708.1; 312/223.2

[56] References Cited

U.S. PATENT DOCUMENTS

| | | | |
|---|---|---|---|
| 4,349,173 | 9/1982 | Volka et al. | 248/346 |
| 4,410,159 | 10/1983 | McVicker et al. | 248/349 |
| 4,568,056 | 2/1986 | Lewinski | 248/677 |
| 4,742,478 | 5/1988 | Nigro, Jr. et al. | 364/708.1 |
| 4,795,120 | 1/1989 | Kuzuya et al. | 248/289.1 |
| 4,830,328 | 5/1989 | Takach, Jr. et al. | 248/639 |
| 4,949,650 | 8/1990 | Allard | 108/146 |
| 5,198,966 | 3/1993 | Kobayashi et al. | 361/680 |
| 5,291,370 | 3/1994 | Yanagisawa et al. | 361/681 |
| 5,337,985 | 8/1994 | Hale | 248/174 |
| 5,583,744 | 12/1996 | Oguchi et al. | 361/683 |

*Primary Examiner*—Donald Sparks
*Assistant Examiner*—John D. Reed
*Attorney, Agent, or Firm*—Schwegman, Lundberg, Woessner & Kluth P.A. & Anthony Claiborne

[57] ABSTRACT

A computer system is provided having a door which hinges about an axis. The door provides a cover for the computer ports, which also seals the ports from the environment. The door has a plurality of detents which allows the door to adjustably elevate the computer system. Alternatively, the door can be stowed under the computer system, where it does not interfere with other cables or cords proximately located.

8 Claims, 5 Drawing Sheets

LAP TOP COMPUTER SYSTEM WITH ELEVATING PORT COVER

FIELD OF THE INVENTION

The present invention relates generally to lap top computers. More particularly, it pertains to a lap top computer having a device for covering the computer ports and elevating the computer above a base surface.

BACKGROUND OF THE INVENTION

The use of lap top computers has increased dramatically as they have become more portable, and simultaneously more powerful. The increased use and transportation of these computers also results in the computers being subjected to harsh environments. Openings or ports on a computer, which are commonly used to connect external devices such as printers or power supplies, provide an opportunity for dirt and debris to enter the computer system as well as causing the system to be exposed to potential port damaging impacts. The dirt interferes with and potentially damages the internal components, and ultimately limits the life of a lap top computer. Thus, it is important to provide a cover for computer ports. Furthermore, as users operate the computer in a wide variety of places, the computer must acclimate to many different surroundings.

Lap top computers typically provide a flat keyboard, which remains flat when the computer is placed on a work surface. Standard desk top keyboards are typically provided at an angle to the desk top surface. Devices for elevating stand alone keyboards are known in the art. One such device is described in U.S. Pat. No. 4,568,056 granted to Lewinski on Feb. 4, 1986, which discloses a tilt mechanism for a stand-alone keyboard. The '056 patent teaches a tilt mechanism which has two springs located within a computer keyboard which has narrow feet for elevating the keyboard. This structure requires a large amount of internal space within the keyboard, and provides two narrow feet located on both edges of the keyboard. The tilt mechanism must be utilized on a surface wide enough to accommodate the distance in between the supporting feet. For instance, the elevational device cannot be utilized if users place the keyboard on their lap, or a surface having a smaller width than the keyboard.

Support devices for lap top computers are known in the art. A detachable support device is described in U.S. Pat. No. 5,337,985 issued on Aug. 16, 1994 to Hale, which teaches a support device for a lap top computer. The '985 patent teaches a support device comprising a set of two panels formed at a right angle. To elevate the lap top computer, the V-shaped devices are affixed to a bottom surface of the computer by a fastener, such as hook-and-loop material, which is applied to both the computer surface and the support devices. The devices are detachable from the lap top computer, and are removed when not in use. The panels are used only to elevate the computer, and not protect the computer ports. The panels are not adjustable; the user has the option of using them at a preselected height, or not using the panels at all.

Accordingly, there is a need for a better way to elevate a lap top computer system without requiring large amounts of internal keyboard space. In addition, there is a need to adequately protect openings and ports from harmful dirt, debris, and impacts.

SUMMARY OF THE INVENTION

A computer system is provided with a port covering door which also provides elevational features. The invention includes a computer system comprised of a computer encompassed by a computer body, and a door member hingedly connected to the computer body. The door member is pivoted to a closed position to enclose the ports and protect them from the environment. The door member is pivoted in the opposite direction to provide an adjustable elevational device for the computer system. Alternatively, the door member is pivoted beneath the computer system, and stowed.

The door member is frictionally engaged in a position where it forms approximately a 90-degree angle with a base surface to provide a maximum elevation for the computer system. Alternatively, the door member provides an adjustable elevational device when it is frictionally engaged in positions where the door member forms an angle substantially greater or less than 90 degrees with the base surface.

Thus, several functions are provided by the door member. In the closed position, it operates as a dust cover to protect ports and openings. It also provides protection for the ports against impacts. In the open position, it provides keyboard elevation. Both functions are accomplished without consuming substantial internal keyboard space by use of a single multi-position port door covering.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claims.

Figure 1:
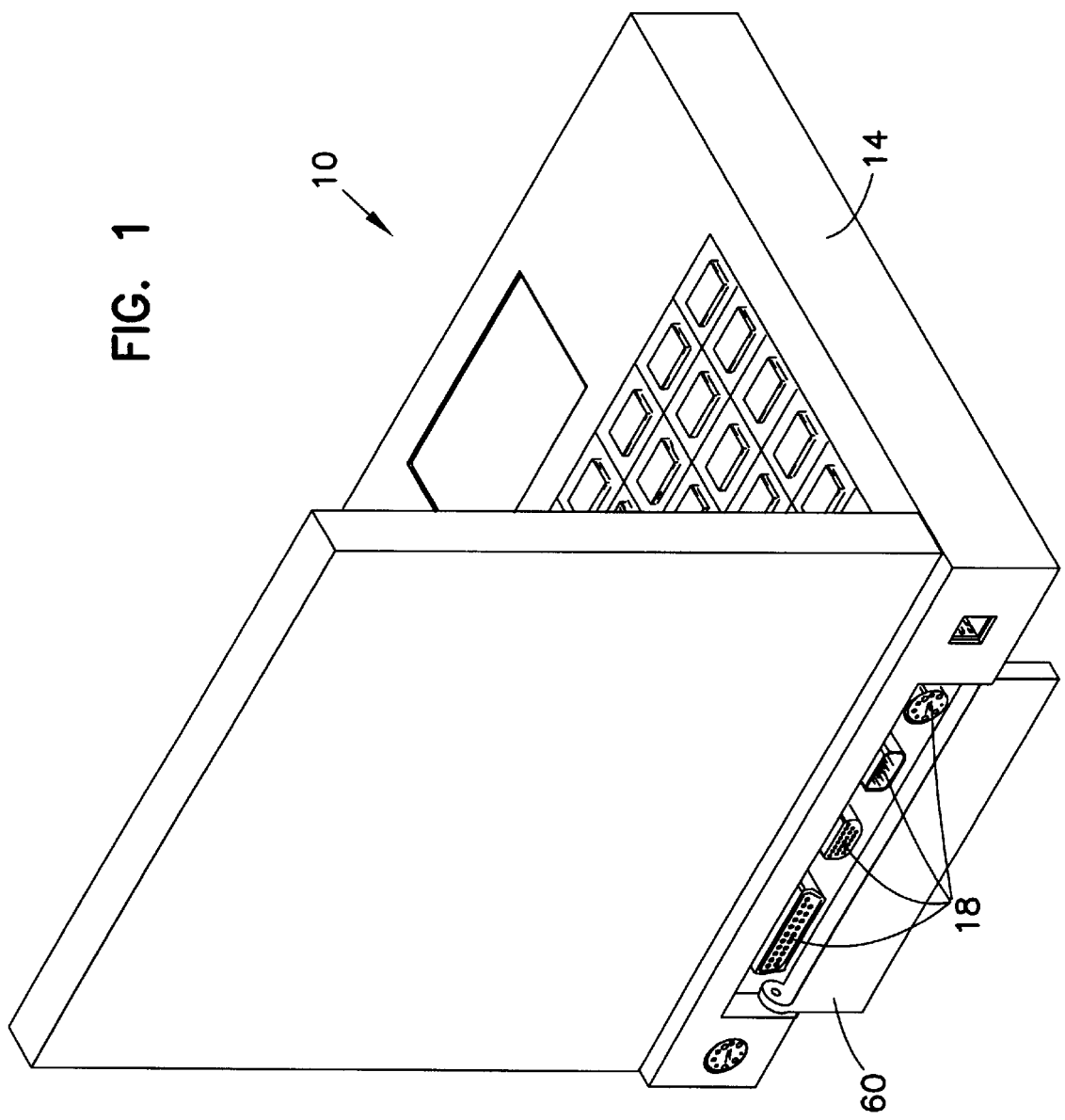
FIG. 1 is a perspective view illustrating a computer system constructed in accordance with one embodiment of the present invention.

Referring to the drawings, FIG. 1 illustrates a computer system 10 constructed in accordance with one embodiment of the present invention. The computer system 10 is shown with a door member 60. The door member is pivoted toward an outside surface of the computer body to cover the ports 18 and other devices located on a computer. The door member is pivoted toward a lower surface to set on a base surface for elevating the computer system 10. Various levels of elevation are achieved by frictionally engaging the door members at a variety of angles relative to the base surface.

Figure 2:
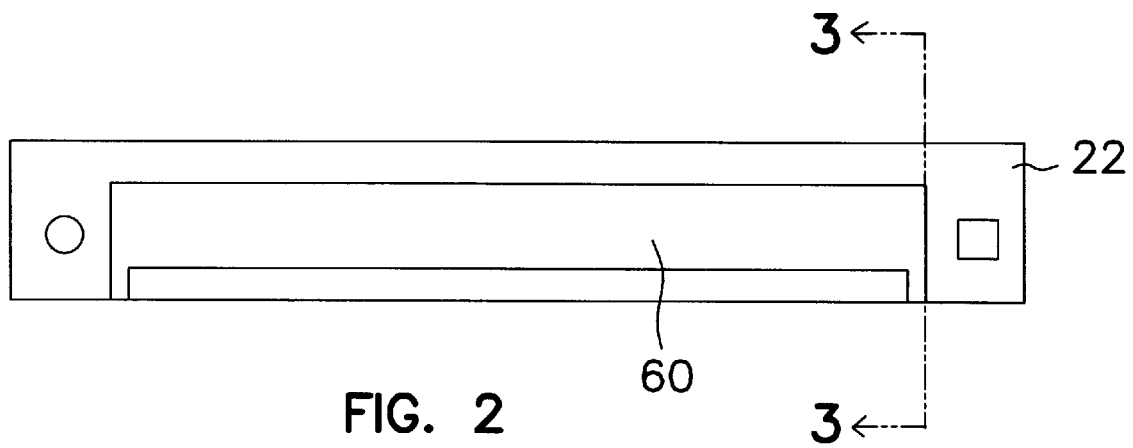
FIG. 2 is a rear elevational view illustrating a computer system constructed in accordance with the present invention.
Figure 3:
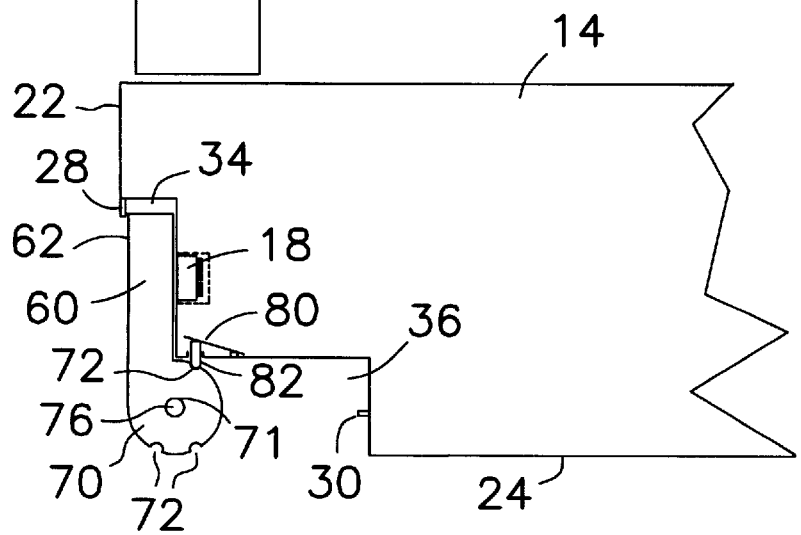
FIG. 3 is an enlarged sectional view illustrating a computer system taken along line 3—3 of FIG. 2.

The door member 60, shown in more detail in FIGS. 2 and 3, has generally a rectangular cross section, and extends across an outside surface of the computer body 14. At each end of the door member 60 is a rotating member 70, having a generally circular opening at its radial axis 76. Each rotating member 70 is generally circular in cross section, although other shapes are contemplated by the scope of the invention. The door member 60 is hingedly attached to the computer body along the radial axis 76 of the rotating member 70.

Figure 4:
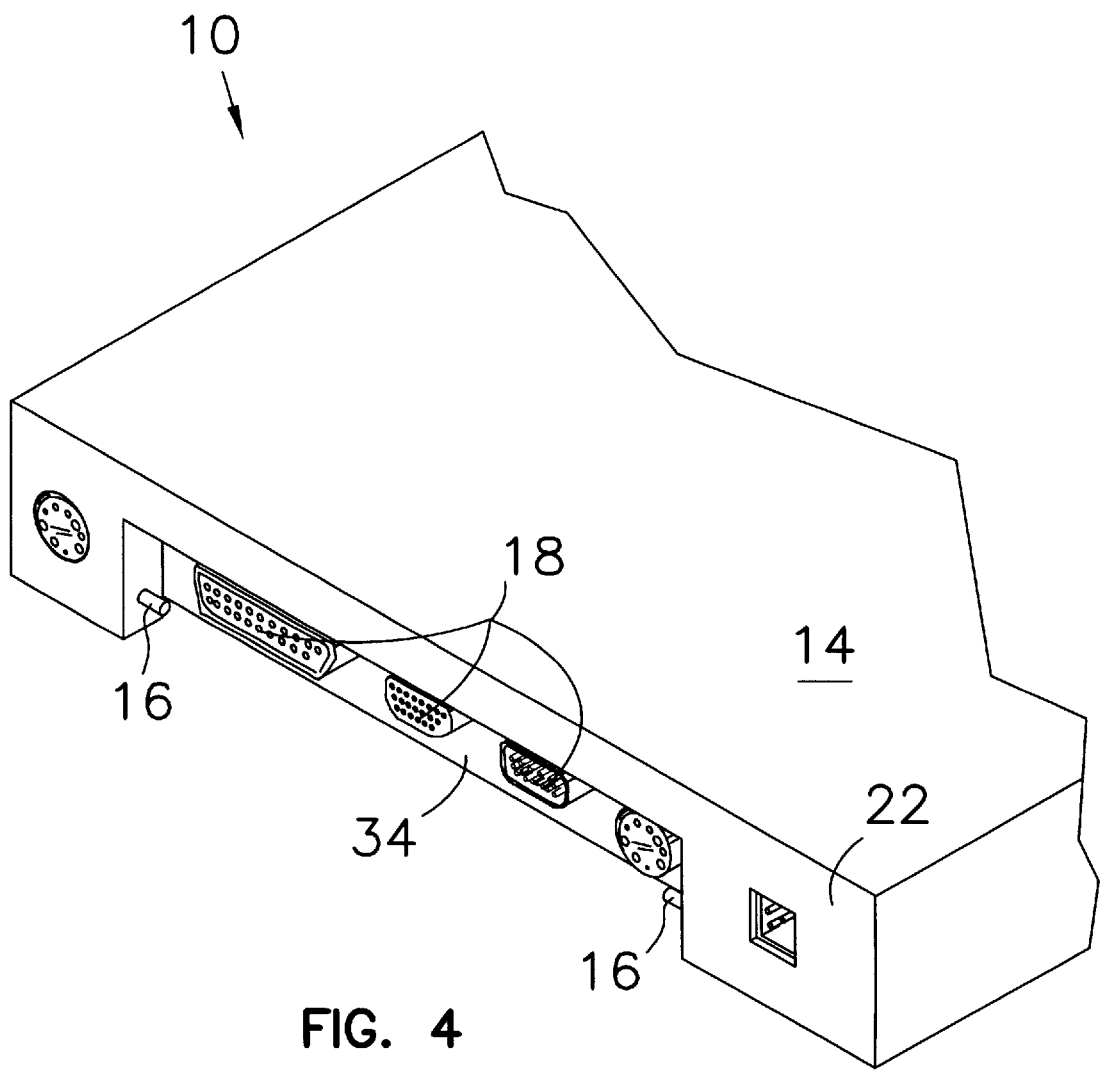
FIG. 4 is a perspective view illustrating the computer system before the door member is installed.

As shown in FIG. 4, there is a pivot post 16 extending from each end of the door member opening on the frame of the computer. The pivot posts 16 mate with the aperture 71 of the door member 60 to permit rotation of the door member between a full open position and a closed position. The door member 60 may take on any number of constructions and configurations without departing from the scope of the present invention. For instance, the door member 60 may have a cut out for receiving ports 18 which extend outwardly from a surface of the computer body 14.

Referring now to FIG. 3, the computer body 14 has an outside surface 22, and is provided with a first cut out 34 therein. The first cut out 34 is sized to receive the door member 60. Referring to FIG. 4, pivot posts 16 are disposed on two surfaces defining the first cut out 34. The pivot posts 16 are generally cylindrical in shape and have a diameter such that they are received by the aperture 71 of the rotating member. The pivot posts 16 are long enough to retain the door member in a hinged relationship with the computer.

The computer body 14 has a first projection 28, which extends from a surface within the first cut out 34. The first projection 28 extends to a length capable of frictionally engaging the door member 60 when the door member 60 is placed in a closed position covering the ports 18. The projection 28 provides a retentive force for retaining the door member 60. Alternatively, other means to retain the door member in a closed position are contemplated. For instance, a magnet assembly used in conjunction with the door member 60 and an inner surface of the first cut out 34 would also retain the door member 60 in a closed position.

The computer body also has a lower surface 24, the lower surface 24 has a second cut out 36. The cut out is sized to receive the door member 60 when it is pivoted under the computer body 14. The computer body has a second projection 30 protruding from an inner surface of the second cut out 36. Similar to the first projection 28, the second projection 30 extends to a length capable of frictionally engaging the door member 60 when the door member 60 is placed in a completely open position where the door member 60 is stowed under the computer body 14.

The computer system has a leaf spring 80 (shown in block form) located therein for frictionally engaging the rotating member. Other constructions or spring assemblies for providing a frictionally engagement of the rotating member 60 are also suitable for use in the invention, such as compression springs, torsion springs, or helical springs. For instance, a biasing member, such as a coil spring, could be coupled with the door member 60. The leaf spring 80 applies force to a pin 82, which is held in frictional engagement with the rotating member 70 by the leaf spring 80. The rotating member 70 has detents 72 therein which are shaped to receive the pin 82. In one embodiment, the rotating member 70 has a plurality of detents. One of the detents 72 is disposed on the rotating member 70 such that when the pin 82 is engaged with the detent, the door member is placed in a perpendicular relationship to the base surface on which the computer system rests. The rotating member 70 has another detent positioned such that when the pin 82 is engaged, the door member 60 is detained at an angle to the base surface, and the computer system is partially elevated from the base surface.

Figure 5A:
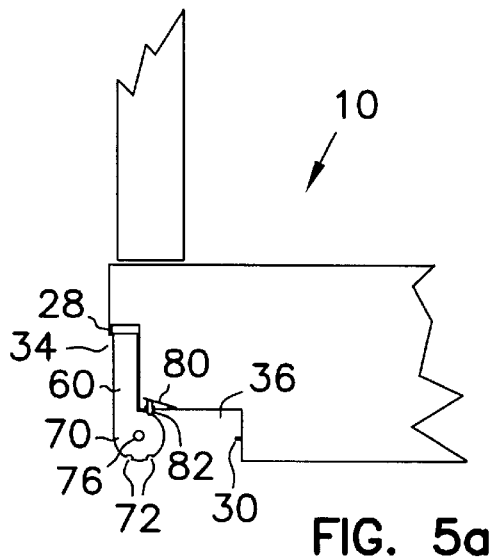
FIG. 5a is a cut-away elevational view illustrating the computer system having the door member in a closed position.
Figure 5B:
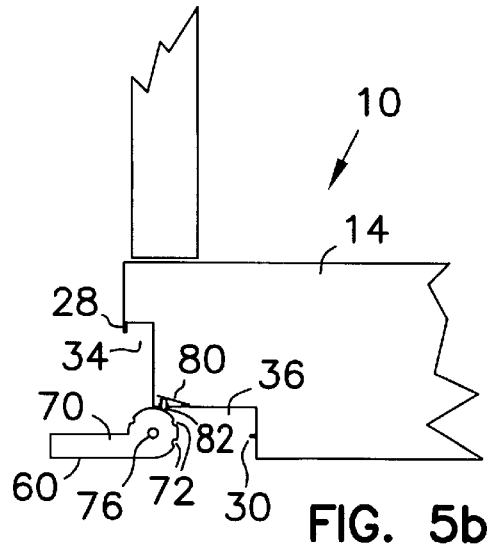
FIG. 5b is a cut-away elevational view illustrating the computer system having the door member in an open position.
Figure 5C:
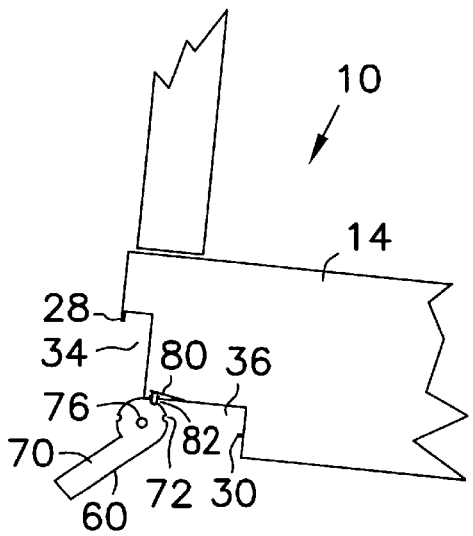
FIG. 5c is a cut-away elevational view illustrating the computer system in a partially elevated position.

As shown in FIGS. 5a–5e, the door member 60 is pivoted about the axis 76 to open and close the door member 60, and to adjustably elevate the computer system 10. In opening the door member from the closed position shown in FIG. 5a, a user disengages the door member 60 from the first projection 28. The door member is rotated away from the first cut out 34, as shown in FIG. 5b. The door member 60 is pivoted about the axis 76 of the rotating member 70 by placing force on the door member 60. The door member 60 is pivoted away from the computer ports 18 until the pin 82 is seated within one of the detents 72, as shown in FIG. 5c. Now, the door member 60 extends below the lower surface 24 of the computer body 14 and is in an angled relationship to the base surface such that the computer system 10 is partially elevated.

Figure 5D:
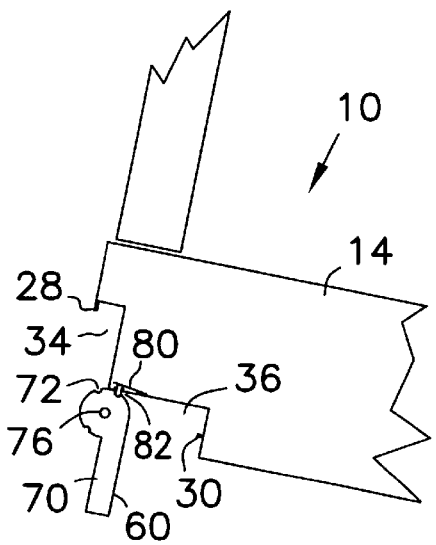
FIG. 5d is a cut-away elevational view illustrating the computer system in a fully elevated position.

The computer system 10 is further elevated when the user applies additional force to the door member 60 to overcome the frictional engagement of the leaf spring assembly 84. The pin 82 is disengaged, and the door member 60 is pivoted about the axis 76 of the rotating member 70 towards the lower surface 24 of the computer body 14. The door member 60 is rotated until the next detent 72 is engaged by the pin 82 as shown in FIG. 5d. The pin 82 seats within detent 72 and holds the door member 60 in position at approximately a 90-degree angle to the base surface. While the pin is engaged with this detent, the computer system 10 is fully elevated from the base surface.

Figure 5E:
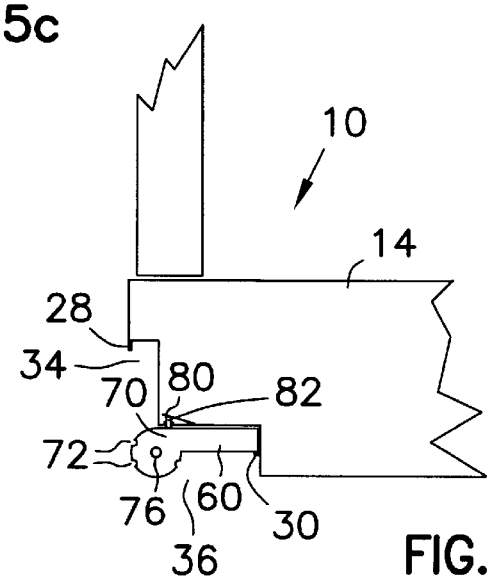
FIG. 5e is a cut-away elevational view illustrating the computer system having the door member in an open position, where the door member is stowed under the computer system.

The user places the door member 60 in a stowed away position lifting up the computer system 10, and applying additional force to the door member 60 towards the lower surface of the computer. The pin 82 is disengaged from the detent, and the door member 60 is pivoted toward the lower surface. The door member 60 is pivoted until it is received by the second cut out 36, and the second projection 30 frictionally engages the door member 60, as shown in FIG. 5e. The door member 60 is now in a stowed away position, and the computer system can be placed directly on a base surface where no elevation is provided to the computer system. The door member 60 is conveniently stored below the computer system, such that the door member 60 does not interfere with the cables and connectors.

Figure 6:
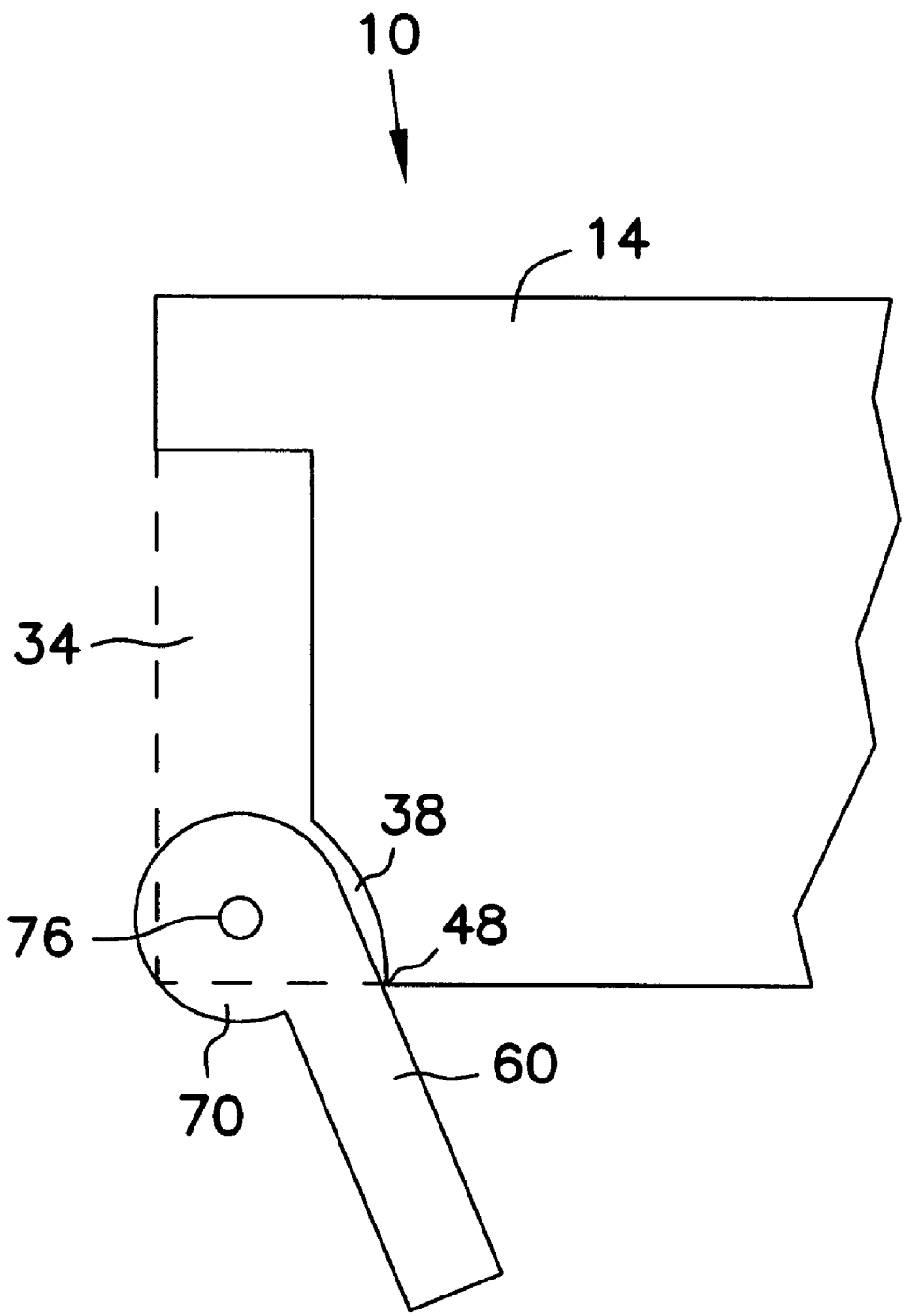
FIG. 6 is a cut-away elevational view illustrating another embodiment of the computer system where the door member is shown in an elevated position.

FIG. 6 illustrates another embodiment of the computer system 10. The computer body 14 has a first cutout 34 and a third cutout 38. The first cutout 34 is sized to receive the door member 60 therein. The third cutout 38 has substantially the same profile as the rotating member 70. The rotating member 70 of the door member 60 rotates about the radial axis 76. As the door member 60 is rotated away from the first cut out 34, the door member 60 rotates under the computer body 14, and is placed in an open position. The door member 60 is rotated away from the first cutout 34 until it rests upon a support edge 48. In the open position, the computer system 10 is elevated when rested upon a base surface (not shown).

As will be evident herein to those of ordinary skill in the art, the door member 60 can be provided with additional doors. The additional doors accommodate creating a smaller opening for access to a particular port when it is not necessary to elevate the computer or if the user does not want the entire door member opened. Constructions for the additional doors include a sliding door, a friction fitted cap, or alternative assemblies which provide access to individual ports without opening the door member 60.

The door member 60 protects the computer ports 18 when a user pivots the door member 60 about the axis 76 into the first cut out 34, and engages the first projection 28 with the door member 60. The surface of the door member 60 is placed in close proximity to the computer ports 18 thereby minimizing space between the door member 60 and the computer body.

The door member 60 provides a convenient and inexpensive way to elevate portable computers, without requiring additional components. Advantageously, the door member 60 is stable and compact and does not occupy significant amounts of the valuable internal space of the computer system. The computer system 10 with the door member 60 also protects the openings from the harsh environment by sealing the ports.

The door member 60 extends substantially across the width of the computer, so the door member can elevate the computer system on narrow surfaces. Additional, the door member 60 provides adjustable elevation, and is integral with the computer system such that individual components will not become displaced.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A portable computer system comprising:
   a computer body encompassing the computer, the computer body supporting a keyboard in a first top surface of the computer body;
   a plurality of ports coupled to a rear surface of the body; the rear surface of the computer body having a cutout therein; a lower surface of the body having a cutout therein; and
   a door member for covering the ports, the door member rotatably coupled to the rear side of the body for covering the ports in a closed position and having at least one open position, the door member substantially planar, the door member having substantially the same shape as the cutouts so that the door member fits securely within both said cutouts; and
   a plurality of projections disposed on an inner surface of the computer body for frictionally engaging a surface of the door member, at least one of said projections maintaining the door member in a closed position substantially enclosed within the rear surface cutout, at least one of said projections maintaining the door member in an open position substantially enclosed within the lower surface cutout.

2. The portable computer system according to claim 1, further comprising a rotating member disposed at each end of the door member and a spring assembly for frictionally engaging the rotating member.

3. The portable computer system according to claim 2, wherein the spring assembly for frictionally engaging the rotating member comprises a biased pin forcibly engaged with the rotating member.

4. The portable computer system according to claim 3, wherein the rotating member has at least one detent therein for engaging said pin in a seated relationship, such that the computer body is elevated when the pin is engaged with the detent.

5. The portable computer system according to claim 4, wherein the rotating member has a plurality of detents therein in a spaced apart relationship.

6. The portable computer system according to claim 2, wherein the spring assembly for frictionally engaging the rotating member comprises a leaf spring assembly forcibly engaged with the rotating member.

7. The portable computer system according to claim 1, wherein the door member extends substantially across the rear side of the computer body.

8. The portable computer system according to claim 1, wherein the door member has at least one cutout on a surface of the door member.

* * * * *